(12) United States Patent
Sjogren

(10) Patent No.: US 7,002,135 B2
(45) Date of Patent: Feb. 21, 2006

(54) METHOD AND APPARATUS FOR PRECISION COUNTING AND TRACKING OF SIGNATURES MOVING BETWEEN A GRIPPER CONVEYOR AND A STACKER INFEED

(75) Inventor: Christer A. Sjogren, Miami, FL (US)

(73) Assignee: Quipp Systems, Inc., Miami, FL (US)

( * ) Notice: Subject to any disclaimer, the term of this patent is extended or adjusted under 35 U.S.C. 154(b) by 266 days.

(21) Appl. No.: 10/644,701

(22) Filed: Aug. 20, 2003

(65) Prior Publication Data

US 2005/0040322 A1 Feb. 24, 2005

(51) Int. Cl.
*G06M 7/00* (2006.01)

(52) U.S. Cl. .................... 250/221; 250/223 R

(58) Field of Classification Search .............. None
See application file for complete search history.

(56) References Cited

U.S. PATENT DOCUMENTS 3,507,492 A * 4/1970 Spencer ................. 271/188
4,037,525 A * 7/1977 Sjogren et al. ........... 414/788.3
4,604,851 A * 8/1986 Reist ......................... 53/430
4,678,387 A * 7/1987 Sjogren et al. ........... 414/790.4
6,876,716 B1 * 4/2005 Sjogren et al. .............. 377/8

* cited by examiner

*Primary Examiner*—Dave Porta
(74) *Attorney, Agent, or Firm*—Volpe and Koenig, P.C.

(57) ABSTRACT

Printed products are accurately detected, counted and tracked as they move from a gripper conveyor to a lay down conveyor. The printed products are further tracked from a position where they reach a sensor upstream of the stacker where the position of selected printed products is provided to the stacker, together with a flag for those selected printed products, to assure that all of the stacker operations, including product stream interception, turntable rotation and bundle ejection, are performed with precision. Counting and tracking are performed by different sensors upstream relative to the stacker and the tracking function is transferred to the stacker when a flagged signature reaches a nip of the stacker infeed. Counting of printed products by the stacker is eliminated.

42 Claims, 9 Drawing Sheets

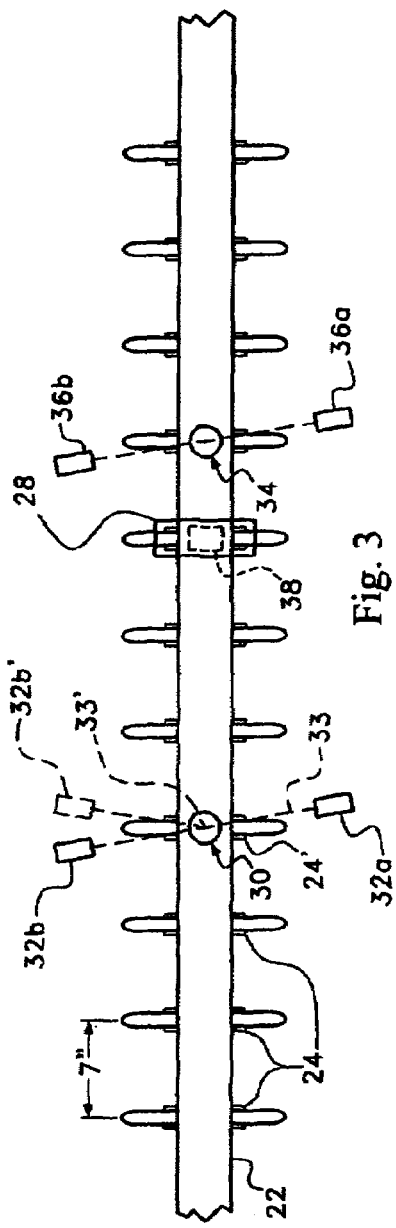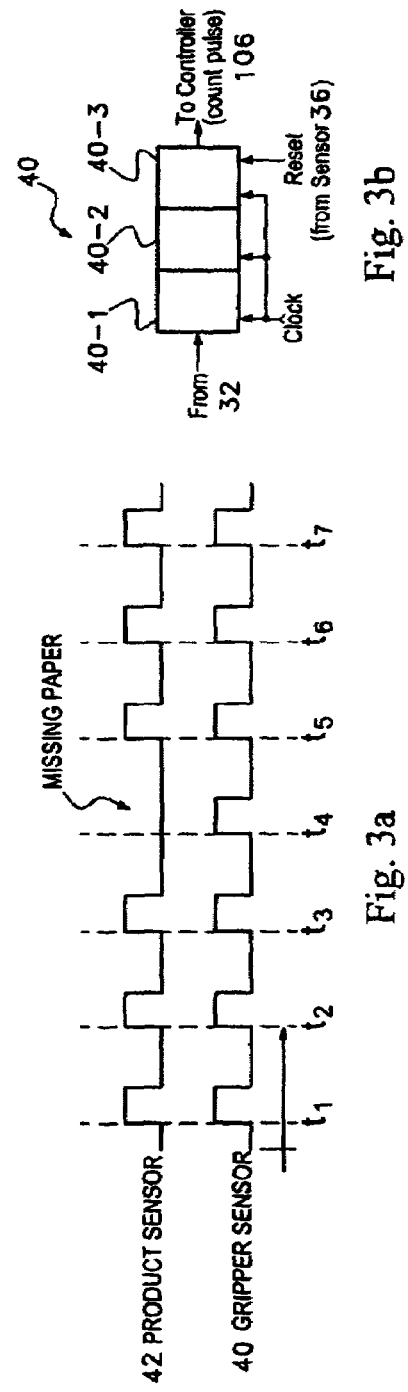

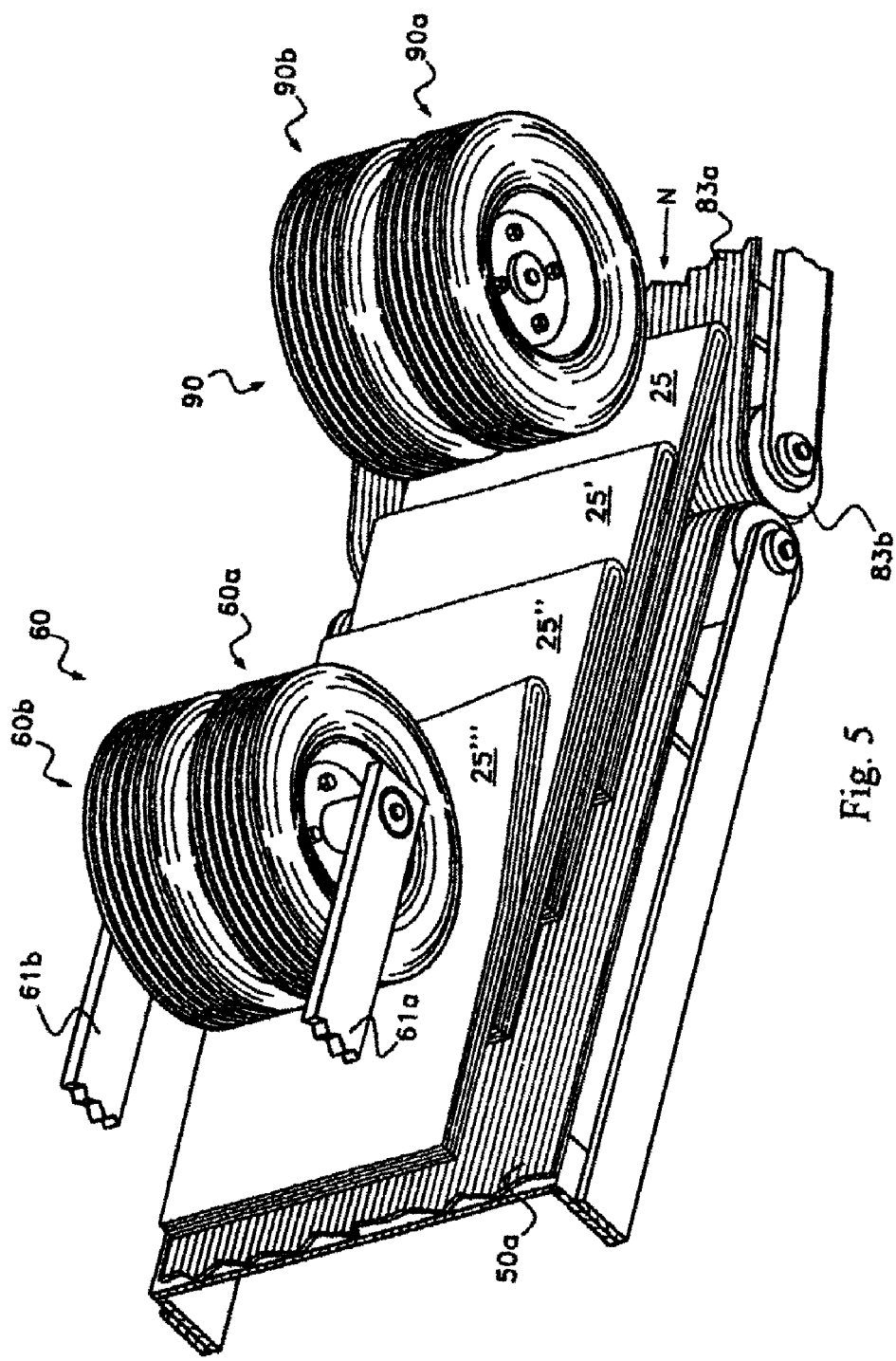

METHOD AND APPARATUS FOR PRECISION COUNTING AND TRACKING OF SIGNATURES MOVING BETWEEN A GRIPPER CONVEYOR AND A STACKER INFEED

FIELD OF INVENTION

The present invention relates to apparatus for use with signature stackers. More particularly, the present invention relates to method and apparatus for accurately counting signatures and tracking flagged signatures being delivered to a stacker to assure proper and precision operation of a stacker.

BACKGROUND

One of the problems that has concerned the newspaper industry for many years is the difficulty of counting inserted newspapers. One of the typical examples of an inserted newspaper is a Sunday edition which includes the news sections in which a large number of inserts such as sections which are typically printed prior to the date of the edition, as well as advertising sections, all of which are inserted into the core newspaper which, for example, incorporates the international, national, and local news, sports and weather. Sections which are not as time sensitive such as a Sunday magazine section, travel section, food section and the like are printed prior to the date that the core section is printed and are inserted into the core section either alone or with advertising sections, typically by inserters. As a result, the newspaper is quite thick and its folded edge, typically referred to as the spine, departs significantly from a sharp, well-defined fold. The sensor which is employed to count signatures, presently utilizes a laser beam to scan the spine (i.e., folded edge) of each inserted newspaper. Laser sensors produce a laser beam having a small diameter, typically on the order of one millimeter. The poor quality and shape of the newspaper containing the aforementioned insertions causes the narrow laser beam to pick up the smallest imperfections such as loose paper, debris, wrinkles, pinholes, and the like, in addition to the spine, resulting in incorrect counts, thereby causing bundles of incorrect counts to be delivered out to the field, generating extra costs due to the extra handling necessary to correct the problem such as making a second delivery to provide additional newspapers due to an undercount or making a delivery to return newspapers originally delivered in bundles having an over-count.

It is therefore extremely advantageous to provide a counting method and apparatus which solves these problems.

It should further be noted that the present invention may be used to count and track signatures that do not have a large amount of inserts or that do not have any inserts, since the invention prevents or substantially eliminates miscounts for signatures be they thick or thin.

It should be noted that the apparatus described herein may be employed to count a variety of printed products such as newspapers, books, magazines, signatures, brochures and these words may be used interchangeably herein without departing from the spirit or scope of the invention.

SUMMARY

Signatures are accurately detected and flagged signatures are tracked as they move from a gripper conveyor to a lay-down conveyor. The flagged signatures are further tracked to a position where they reach a nip point at the infeed to the stacker where the count and an accurate position of each flagged signature is transferred to a stacker to assure that the timing of all of the stacker intercept, turn (of a turntable) and bundle eject operations are performed with precision

BRIEF DESCRIPTION OF THE DRAWING(S)

The present invention will be understood upon consideration of the accompanying description and drawings wherein like elements are designated by like numerals and, wherein:

FIG. 3 shows a top plan view of the gripper conveyor shown in FIG. 2 and which is useful in explaining the novel counting technique of the present invention.

FIG. 3a shows a plurality of waveforms useful in understanding the counting technique of the present invention.

FIG. 3b is a schematic diagram of a circuit employed for tracking printed products from the gripper sensor location to the release cam.

FIG. 5 is a perspective view showing the transfer wheel assemblies of FIG. 2 in greater detail.

Figure 6A:
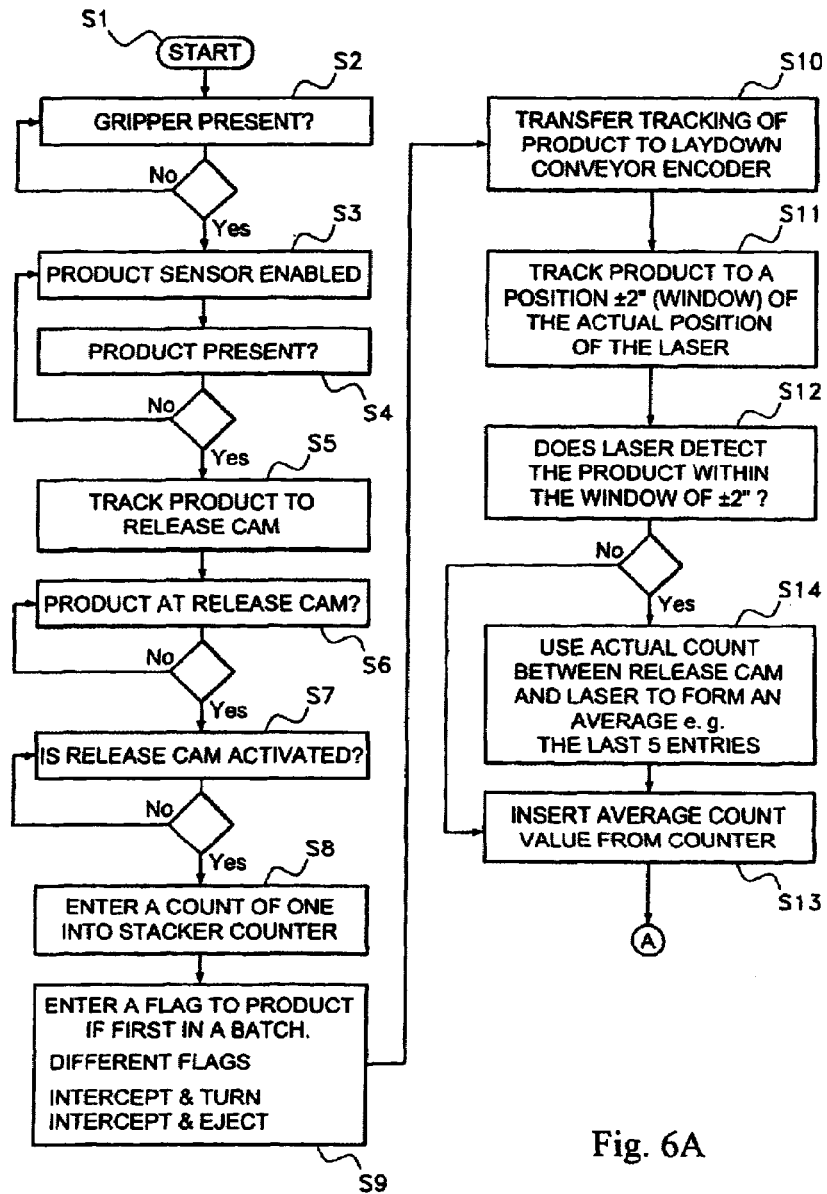
Figure 6B:
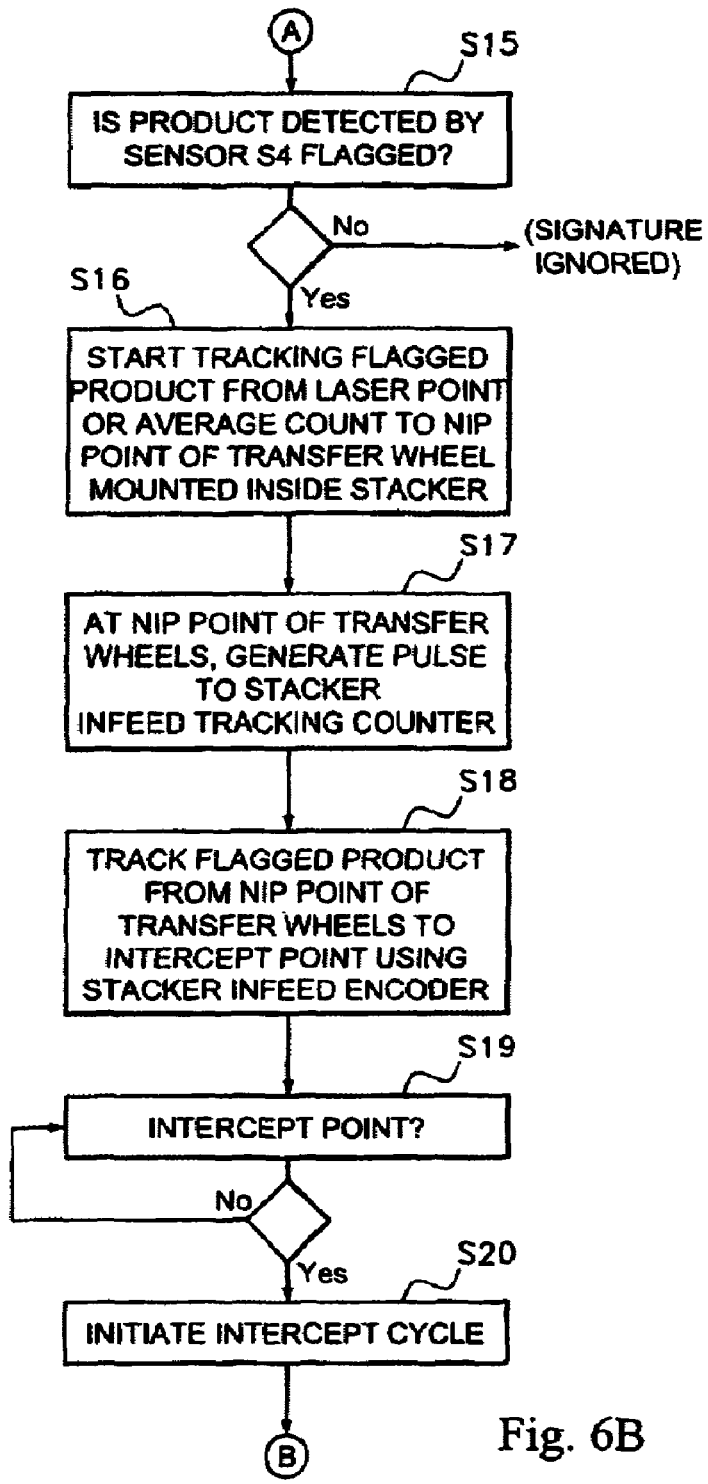
Figure 6C:
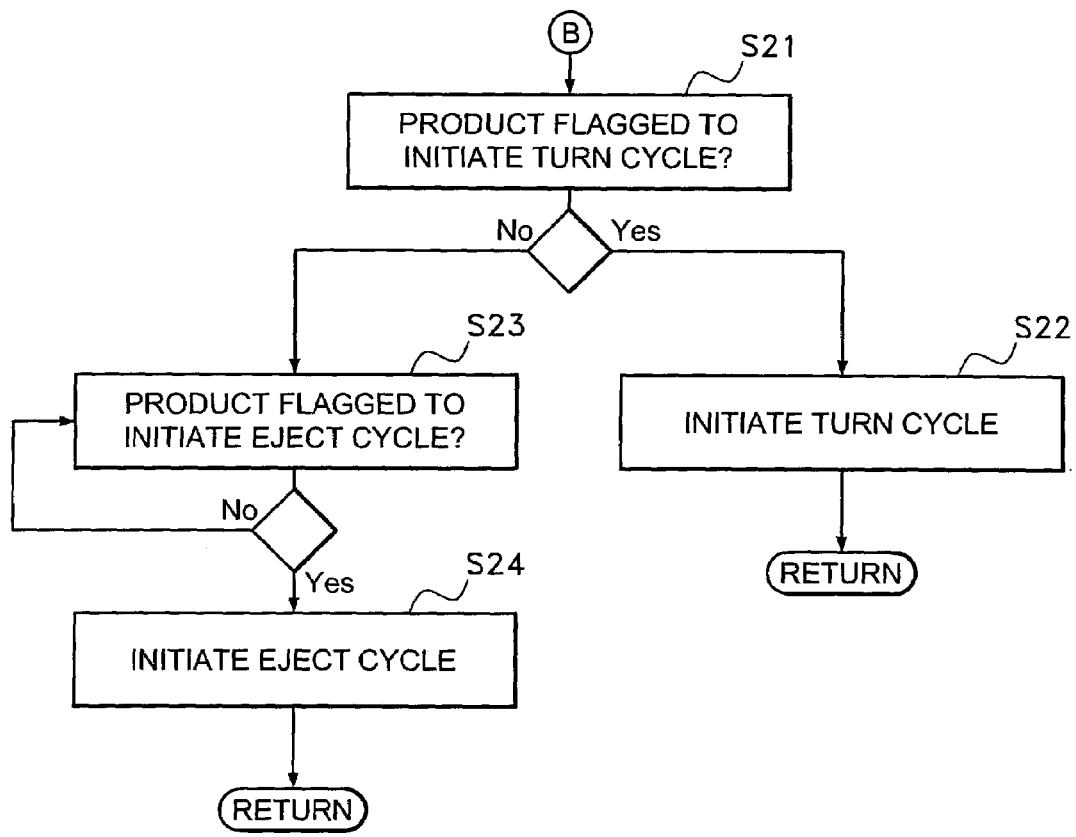

FIGS. 6A, 6B, and 6C, taken together show a flow diagram of the technique of the present invention for accurately counting and tracking signatures.

DETAILED DESCRIPTION OF THE PREFERRED EMBODIMENT(S)

The present invention employs a system which avoids the need to rely upon the laser beam and the laser sensor typically employed within a stacker to count signatures inside the stacker infeed but, to the contrary, employs simple, standard photocell sensors to detect the presence or absence of each newspaper held in a gripper which is located external to and upstream relative to the stacker. The present invention then tracks newspapers from the count point to a fixed location upstream from the stacker infeed to develop a count of pulses from a point where the signatures are deposited on a lay-down conveyor to a sensor. This count is used to develop an "average count" which is employed to be used in place of a count for a signature which may be missed. The tracking continues from the sensor location to a nip of the stacker infeed which is a fixed distance from the sensor. The tracking of the signature is then "handed over" to the stacker infeed tracking system. The small size diameter (typically 1 mm) of a beam in conventional laser sensors employed to count signatures are not capable of distinguishing a true count generated by a leading edge of a newspaper from conditions such as loose paper, debris, wrinkles, pinholes and the like, which conditions are capable of causing a laser beam sensor to miscount, i.e. by identifying such conditions as the presence of a signature.

Figure 1:
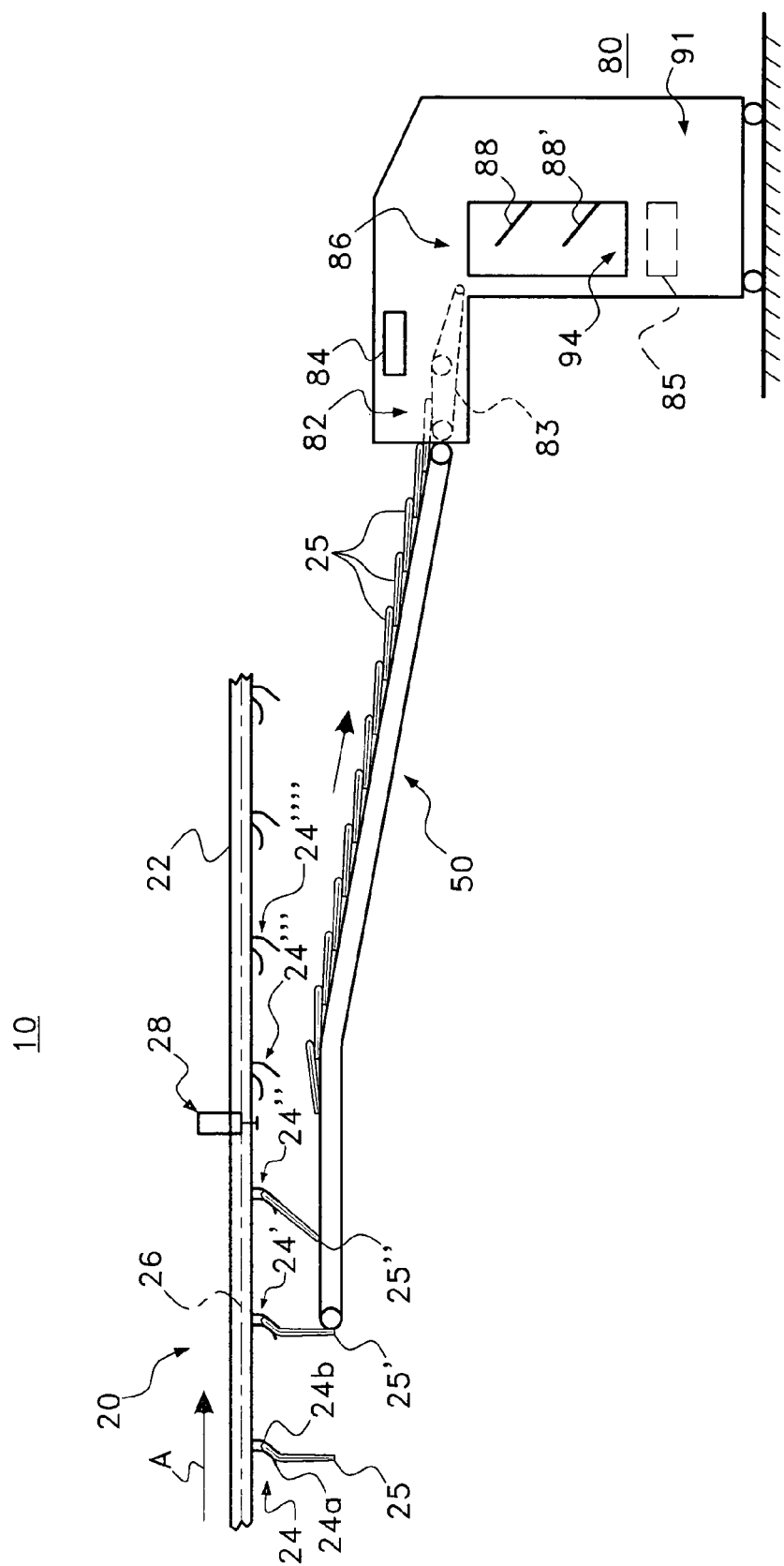
FIG. 1 is an elevational view showing conventional apparatus utilized to count and stack signatures.

FIG. 1 shows a conventional system which lacks the novel capabilities of the present invention. The system 10 is comprised of a gripper conveyor 20, a lay-down conveyor 50 and a stacker 80. The gripper conveyor 20 is comprised of a track 22, only a portion of which is shown for purposes of simplicity. It should be understood that each gripper 24 of track 22, in one preferred embodiment, receives an inserted signature, i.e., a signature with all of the desired inserts inserted into the core signature, typically from a device known as an inserter. The gripper grips the "cut edge" of the signature. The gripper conveyor 20 is typically designed to deliver inserted signatures to one or a plurality of stackers arranged at given locations along the path of the track 22. FIG. 1 shows only one stacker for purposes of simplicity, it being understood that additional stackers may be located both upstream and downstream of the stacker 80 shown in FIG. 1.

A plurality of grippers 24 are arranged along track 22 and are maintained at substantially equally-spaced intervals by a chain (not shown) extending through track 22 as represented by chain line 26, each gripper 24 being coupled at spaced intervals along the chain, typically spaced apart by a distance of the order of 7.00 inches.

Each gripper assembly is comprised of a pair of gripper jaws 24a, 24b which may be locked into a gripping position to hold a printed product 25. The gripper jaws may be opened by a selectively operated gripper release cam 28 which, when activated, opens the gripper jaws of a gripper passing the gripper release cam as it moves in the feed or downstream direction represented by arrow A. FIG. 1 shows a gripper 24" holding a printed product 25" and approaching the gripper release cam 28. As the gripper 24" reaches the gripper release cam, the engaging member of cam 28 opens the jaws of the gripper 24", causing the printed product to be dropped from the gripper. Gripper 24'" is a gripper which has passed the gripper release cam 28, which was activated, causing the jaws to be in the open position. The gripper release cam 28 is selectively operated and may, for example, deliver signatures from the gripper conveyor 20 to lay-down conveyor 50 in any selected order. Additional release cams (not shown) located at positions upstream and/or downstream of the gripper conveyor section shown in FIG. 1 are utilized to selectively deliver printed products to other stackers. Thus, the gripper release cam 28 may deliver to lay-down conveyor 50 every printed product, every other printed product, every third printed product, two consecutive printed products while letting the third printed product pass downstream and so forth to mention just a few of the many possible permutations and combinations. Grippers and release cams having the above capability are well known in the art and will not be described herein in detail for purposes of simplicity.

The printed products are delivered to lay-down conveyor 50 which is a belt conveyor for moving printed products deposited thereon from the gripper conveyor 20 to the stacker 80. The stacker 80 is typically comprised of an infeed section 82 comprised of a conventional infeed conveyor 83 only a lower portion of which is shown for purposes of simplicity, which receives printed products 25 arranged in an imbricated stream, i.e., in an overlapping, shingle fashion, folded edges facing downstream.

The printed products are sensed by laser sensor 84 which utilizes a laser beam to count printed products and also to provide a tracking signal which is utilized to control the stacking section 86 provided with at least one or more stacking blades 88, 88' upon which printed products are stacked. When a stack of printed products of a given count are deposited on the lower stacking blade assembly 88', the upper stacking blade assembly 88 is abruptly moved into the printed product stream being fed to the stacking section to "intercept" the signature stream. As one example, assuming that stacks of twenty (20) printed products are to be formed, when the laser sensor 84 counts the twentieth ($20^{th}$) printed product, the time interval required for the twentieth ($20^{th}$) printed product counted to reach the intercept point is known since the distance between the laser sensor and the intercept point is known and the speed of the stacker infeed conveyor is constant, and count pulses representing this time interval are utilized to initiate abrupt movement of intercept blade 88 into the intercept position after the twentieth ($20^{th}$) signature has been delivered to the intercept blade assembly 88'.

The completed stack of twenty (20) printed products is deposited on a turntable 85 of an out-feed section 91 and the next group of twenty (20) signatures are accumulated upon the intercept blade 88. The turntable is selectively rotatable to form compensated bundles, as is conventional. Assuming a bundle of forty (40) printed products is to be formed, after the first stack of twenty (20) printed products is deposited on the turntable, the turntable is rotated through 180° in readiness to receive the second stack of twenty (20) printed products presently being accumulated on intercept blade 88. When the stack of forty (40) printed products forming a compensated bundle is completed, the compensated bundle is pushed out of an opening of the stacker which, although not shown can be on the right-hand end or one of the sides adjacent to the right-hand end, as is conventional; and onto a conveyor (not shown) where the compensated bundle is tied and moved to a delivery location, all of these operations being well known in the art. As was set forth above, the inability of the laser beam to distinguish irregularities of a printed product from a spine of a printed product leads to potentially costly miscounts, resulting in bundles of incorrect counts.

The present invention provides an accurate counting capability while using a technique which employs standard sensors for counting.

Figure 2:
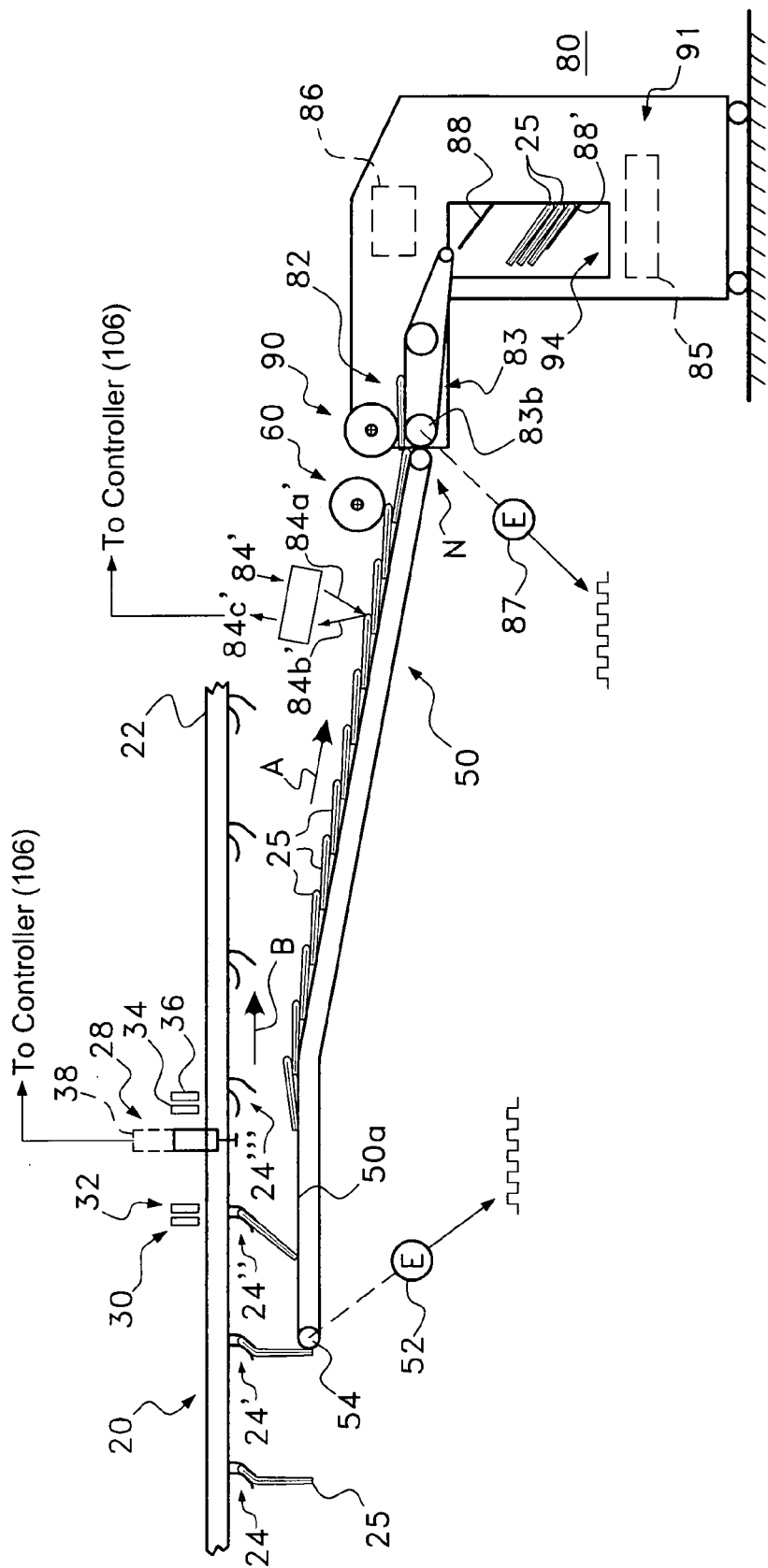
FIG. 2 shows apparatus for counting and tracking signatures delivered to a stacker and embodying the principles of the present invention.

Making reference to FIG. 2, wherein like elements are designated by like numerals, the gripper conveyor 20 is provided with a gripper sensor 30 and a product sensor 32. The gripper sensor 30 senses the presence of a gripper 24 moving past sensor 30 and approaching release cam 28. The product sensor assembly 32 detects the presence or absence of a printed product in the detected gripper 24.

The gripper conveyor 20 is further provided with a second gripper sensor 34 and a printed product sensor 36 on the downstream side of the release cam 28 and separated from the release cam by a distance which is less than the distance between grippers, and is preferably of the order of approximately 5" downstream of the release cam 28, for a purpose to be more fully described below.

An encoder 52 is coupled to a rotatable upstream roller 54 for generating pulses preferably representing each quarter inch (0.250") of travel of the lay-down conveyor 50. The laser sensor 84 in the stacker 80 shown in FIG. 1 and typically used for counting purposes is eliminated and a laser sensor 84, arranged a pre-set and known distance upstream from the stacker infeed section, is employed for tracking purposes only, as will be more fully described.

The manner in which the present invention accurately counts and tracks printed products will now be described.

As was mentioned above, the gripper conveyor 20 picks up printed products typically either from a printing press or an insert machine holding the products along the cut edge 25b, each printed product being suspended with the spine 25a at the lower end thereof. The gripper sensor 30 is located upstream relative to the release cam 28 as can best be seen in FIG. 3 which, in the embodiment shown, is spaced by a distance equal to three (3) gripper spacing lengths from the release cam 28. However, it should be understood that a greater or lesser number of gripper intervals may be utilized with equal success.

Each gripper assembly 24 passing the gripper sensor assembly 30 causes a pulse to be generated as shown by waveform 40 in FIG. 3a, each square pulse representing detection of a gripper. Each pulse generated by the gripper sensor 30 triggers the operation of the printed product sensor 32 by energizing the light source 32a of sensor 32 which directs a light beam, as shown by dotted line 33, to the light receiver 32b of printed product sensor 32. The light source 32a and receiver 32b are positioned below the gripper conveyor 20 and are aligned diagonally relative to a plane of a printed product 25 whereby the presence of a printed product blocks the light beam 33 from reaching receiver 32b while the absence of a printed product enables the light beam 33 from source 32a to reach receiver 32b. Alternatively, the receiver 32b may be positioned on the same side of the signature to be counted as the source, 32a as shown by "dotted line" receiver 32b'. Receiver 32b' receives light 33 reflected when a signature is present and fails to receive reflected light in the absence of a signature.

Figure 4:
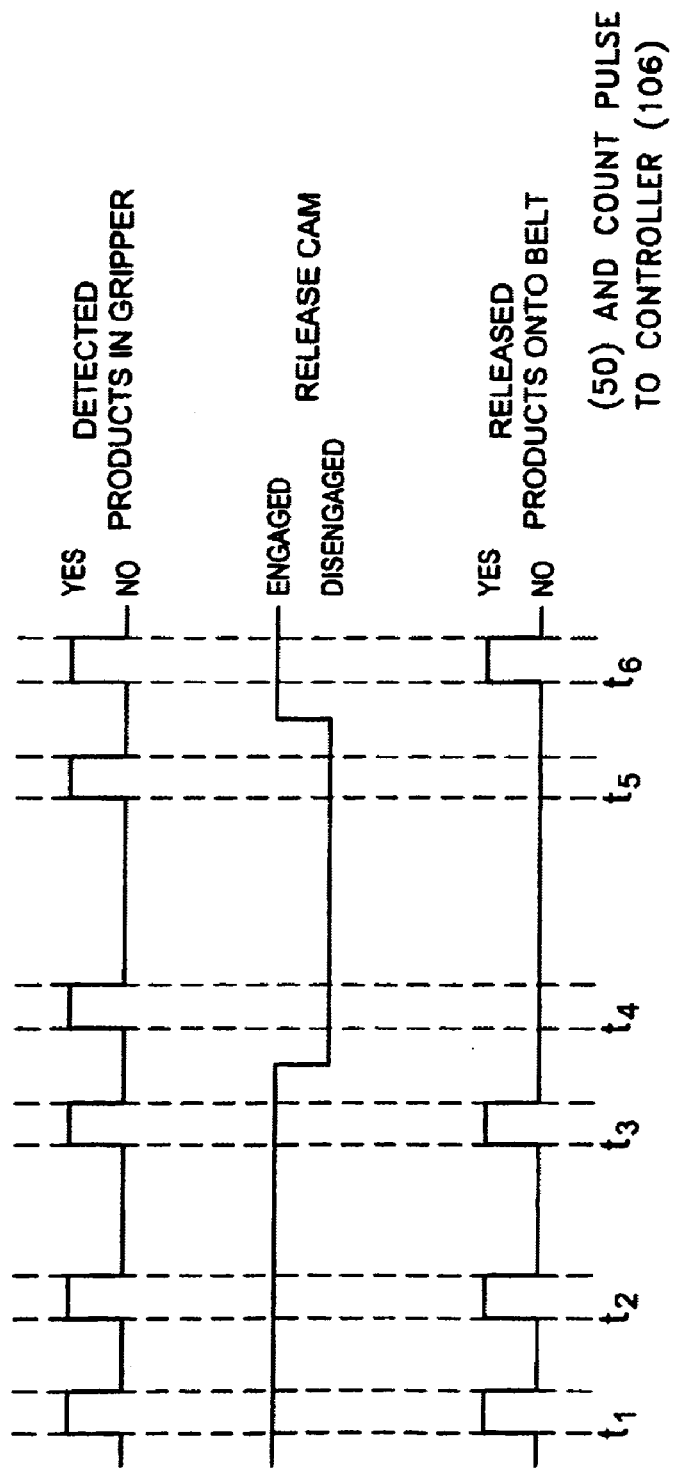
FIG. 4 shows a plurality of waveforms useful in describing the manner in which the present invention detects the transfer of signatures from the gripper conveyor to the lay down conveyor.

Waveform 42 shows the pulses generated by the product sensor assembly 32. For example, the waveforms shown in FIG. 3a represent the pulses generated for seven (7) consecutive grippers 24. The gripper sensor 30 pulses each trigger operation of the product sensor 32, and, in the example given, the first three (3) grippers each carry a printed product ($t_1$–$t_3$), the fourth gripper is empty ($t_4$) and the next three grippers passing the gripper sensor each carry a printed product ($t_5$–$t_7$). However, the fourth sensor passing the gripper sensor at time t4 is empty, which results in no pulse being generated at this time, which indicates that the gripper passing the gripper sensor 30 at time t4 is empty. FIG. 4 shows an example of two (2) missing printed products at t4 and t5. Printed products are counted at $t_1$–$t_3$ and $t_6$.

As is mentioned above, the release cam 28, when operated, opens the jaws 24a, 24b of a gripper 24 passing the release cam 28. To be assured that the printed product held by the gripper passing through the activated release cam has indeed released a printed product, a gripper sensor 34 and a product sensor 36 respectively similar in design and function to the sensors 30 and 32, detect grippers as they pass downstream relative to release cam 28 at a separation distance which is approximately two inches (2.0") less than the spacing between adjacent grippers. Sensors 34 and 36 function in a manner to be more fully described below.

The present invention operates in the following manner:

As is pointed out above, printed products are conveyed by the gripper conveyor 20 along a gripper track 22. The printed products are transferred to individual grippers 24 either directly from a printed product press or an inserter machine, both types of transfers being well-known in the art.

Printed products are very accurately detected by the combination of the gripper sensor 30 and product sensor 32, the gripper sensor 30 triggering the product sensor 32 to take a "snapshot" for the purpose of detecting the presence or absence of a printed product in the gripper 24 detected by the gripper sensor 30. In the example given, this detection occurs at a given distance upstream relative to release cam 28 which is equivalent to the separation distances of grippers 24 which are three (3) grippers apart.

In a case where a printed product is present in the gripper detected by gripper sensor 30, this gripper is tracked digitally by counting grippers passing from the gripper sensor 30 to the release cam 28. The gripper sensor 30, in addition to triggering operation of the printed product sensor 32, applies a clock pulse to a shift register, shown in FIG. 3b. When the gripper 24 detected by gripper sensor 30 contains a printed product which is detected by product sensor 32, a binary one ("1") state is loaded into the first stage 40-1 of shift register 40. When the next upstream gripper passes gripper sensor 30, the product sensor 32 is triggered. The condition of the product sensor is loaded into stage 40-1 by a clock pulse from the gripper sensor 30 which further transfers the status initially loaded into stage 40-1 to stage 40-2.

When the gripper 24' reaches the release cam 28, another "snapshot" is taken by the sensor 38 to determine the status of the release cam. If the release cam is engaged, the product carried by the gripper passing the release cam 28 will be released from the gripper and the product will be transferred to an upstream end of the lay-down belt conveyor 50. At that instant, the product tracking function is transferred to the lay-down conveyor 50. The binary state of stage 40-3 is transferred out of shift register 40. The binary state represents a count (or no count) which is provided to the stacker 80. When a printed product fails to be released by the release cam, this is detected by the printed product sensor 36, triggered by gripper sensor 34, which resets stage 40-3 to zero ("0") state before the state of register stage 40-3 is shifted out.

Encoder 52 is mechanically coupled to an upstream roller 54, which rotates as the conveyor belts are moved, and the encoder 52 is coupled through appropriate gearing to generate a pulse approximately every quarter inch (0.25") of linear belt travel of the lay-down conveyor 50. The product can now be accurately tracked as it is being conveyed by the upper run 50a of the lay-down conveyor belt, even though the lay-down conveyor does not move at a constant speed.

In the event that the release cam is not engaged, either due to a faulty operation or due to the fact that the signature passing the release cam is intended to be directed to another lay-down conveyor, the printed product is not transferred on to the lay-down conveyor and therefore tracking of that product is not transferred to lay-down conveyor 50.

When the release cam sensor 38 detects engagement of release cam 28, causing a printed product to be transferred onto the lay-down conveyor, the status of the gripper passing the release cam and reaching the third stage 40-3 of shift register 40 transfers the status of stage 40-3 to a stacker controller 106 which is preferably a microprocessor capable of performing a counting function to accumulate the number of printed products delivered to the lay-down conveyor.

A bundle may consist of one or more individual batches and preferably two batches in order to form a compensated bundle. As one example, let it be assumed that each batch of a compensated bundle contains twenty (20) printed products and that a bundle contains two (2) batches for a total of forty (40) printed products. As is well known in the art, the folded edge or spine of a printed product has a thickness which is greater than the cut edge whereby a stack of twenty (20) printed products has a height at the spine end of the batch which is greater than the height of the cut edges. In order to provide a substantially level bundle, the first batch of twenty (20) printed products is deposited on a turntable in the stacker, which turntable, after receiving the first batch of twenty (20) signatures, is rotated 180° in readiness for receipt of the next batch of twenty (20) printed products to be deposited thereon thereby forming a "compensated bundle" as is well known. As a result, stacker 80 has to perform an intercept operation for every batch and therefore must know if a printed product is the first product in the new batch or the first product in the new bundle in order to know when to intercept the signature stream, when to activate the turntable and when to actuate the ejection mechanism which ejects a completed bundle from the stacker 80 onto a conveyor for tying and subsequent delivery to an output destination.

The stacker controller 106 which may be a CPU or a microprocessor, performs a counting function for counting signatures delivered to the lay-down conveyor. The first ($1^{st}$), twenty-first ($21^{st}$), forty-first ($41^{st}$) signature, etc., transferred to the lay-down conveyor 50 carries a "flag" provided by the controller 106 which identifies it as the first printed product of a first batch or the first printed product of a second batch in order to determine if an intercept signal and/or a turn signal and/or a bundle eject signal should be generated when the printed product which is so-flagged reaches an intercept point inside of stacker 80. The intercept point is the point at which a stacker blade 88 "intercepts" a stream of printed products delivered from the stacker infeed section 82 to the stacking section containing stacker blades 88 and 88'. As an example, as printed products 25 are stacked upon stacker blade 88', stacker blade 88 is positioned above the incoming stream of printed products. After the twentieth ($20^{th}$) printed product is delivered to stacker blade 88', stacker blade 88 abruptly intercepts the twenty-first ($21^{st}$) signature received from the infeed section 82 responsive to the flag representing the twenty-first ($21^{st}$) signature while allowing the twentieth ($20^{th}$) signature to pass beneath blade 88 and be collected upon blade 88'.

Blade 88' is then abruptly pulled out from beneath the stack of twenty printed products in the region 94 (see FIGS. 1 and 2) and delivers the completed stack to a selectively rotatable turntable 85 which also has an ejection mechanism (not shown for purposes of simplicity) for ejecting a completed bundle, as is conventional.

Returning to the time at which the release cam 28 is engaged, a printed product is dropped onto the lay-down conveyor 50. The printed product moves in the direction of arrow B and the location at which the printed product lands upon the lay-down conveyor 50 is a function of the velocity of the printed product at the time it was transferred onto the conveyor 50 as well as the weight or mass of the product, which is a function of the product thickness. In view of the fact that the weight or mass of a printed product may vary from one to the next and further in view of the fact that the conveying speed of the grippers 24 may depart from a constant value, the exact position of a printed product deposited on the lay-down conveyor cannot be assured. As a result, tracking laser sensor 84, which is located a given distance downstream from release cam 28 and hence from the release position, establishes exactly where the folded forward edge, i.e., spine, is located along the lay-down conveyor 50.

Figure 4A:
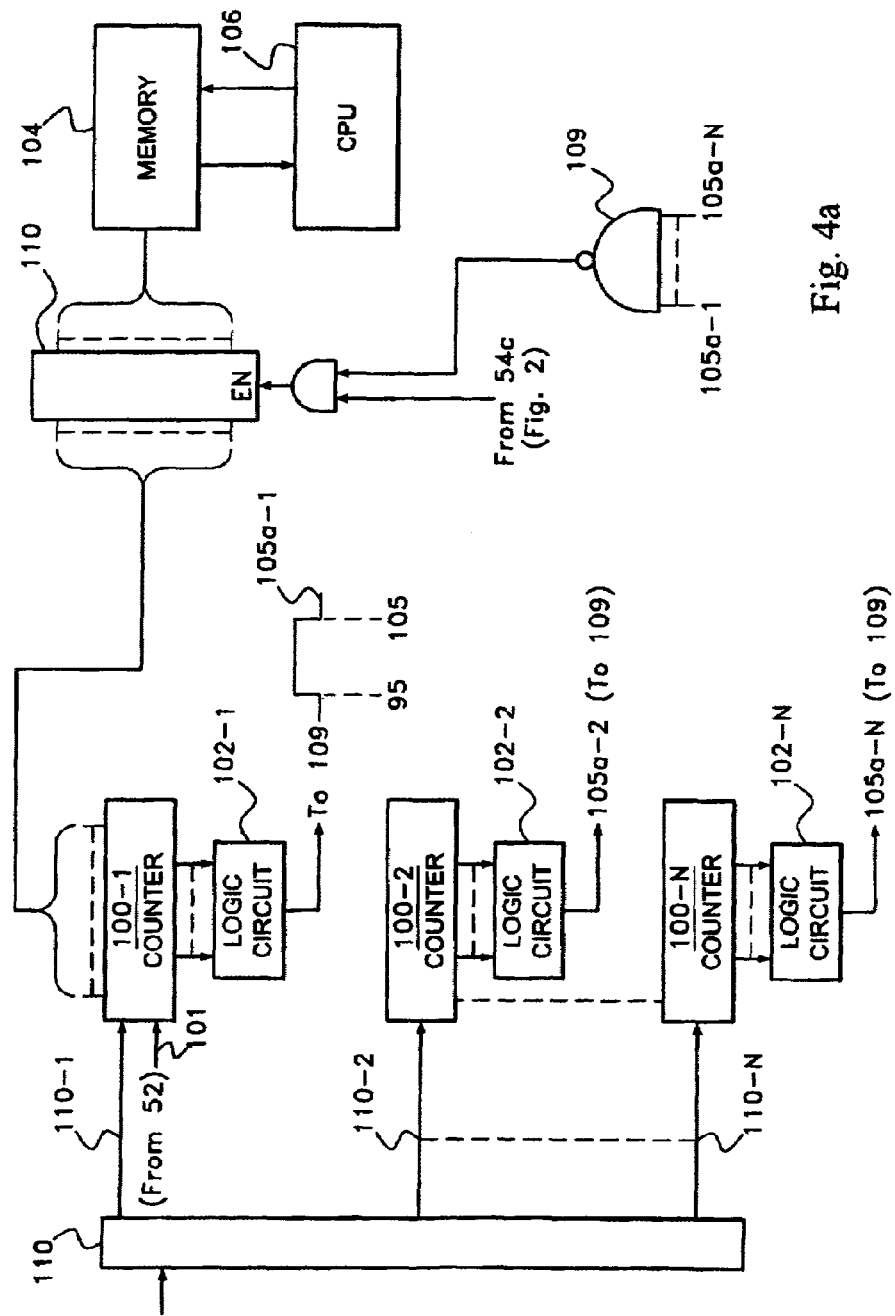
FIG. 4a is a schematic diagram of the circuitry employed to track printed products delivered to the lay down conveyor.

A nominal distance range between the release position and the laser beam of laser sensor 84 is provided in the form of a number of pulses derived from encoder 52, which pulse count is kept in the controller 106. A "virtual window" is provided by controller 106 in which to "track" the printed product from the release point of the gripper conveyor to the laser sensor 84' which uses beam 84a' to sense the position of each passing signature. The actual count of the number of pulses between the release point and the point where a signature is sensed by sensor beam 84a' is determined for each printed product and this actual count is stored in a memory in controller 106. The memory stores a given number of actual counts and this given number of counts is averaged to determine an average of the distances measured between the release position and the laser beam 84a' for the plurality of signatures. In one example, it will be assumed that actual counts for five (5) printed products delivered to lay-down conveyor 50 are stored in memory and these counts are summed and divided by five (5) to provide an average count. Tracking controller 106 employs a first in/first out (FIFO) routine wherein, as the sixth ($6^{th}$) count of a printed product is received and stored in memory, the first stored count is disposed of and thus the second ($2^{nd}$) through sixth ($6^{th}$) counts are averaged. Using this technique allows the computer to detect trends. As shown in FIG. 4a, which depicts a "hardware technique", each count from the release cam advances the shift register 110. As each output 110-1, 110-2, . . . 110N is "high", its associated counter 100-1, 100-2, . . . 100-N is cleared and starts to accumulate pulses from encoder 52 as the printed product moves along the lay-down conveyor 50 toward the laser beam 84'. It should be understood that "averaging" is preferably performed by the controller, which is preferably comprised of a microprocessor or CPU. The hardware representation is useful in understanding the method steps used to perform "averaging". Also the "averaging" function may be performed by hardware as an alternative to a microprocessor routine.

A "virtual window" of, for example, plus or minus five (±5) counts on either side of the nominal count establishes a "window" whereby, when the leading edge of a signature is detected by sensor 84' it is ignored unless it lies within the virtual window. Laser sensor 84' searches for a reflected laser beam. The laser sensor 54 is arranged in such a manner that the emitted laser beam 84a' forms an acute angle with the upper surface of the lay-down conveyor 50 in the region of the laser sensor 84'. The emitted laser beam 84a' is normally reflected as shown at 84b' and picked up by a receiver in the laser sensor 84' in the absence of a spine. When a spine is present, the otherwise reflected laser beam is blocked by the spine from reaching the receiver, thereby providing a signal which identifies the position of the spine of each signature with a high degree of accuracy. It should be kept in mind that the signal from laser sensor 84' is used only for tracking and not for counting and flagging signatures, the counting and flagging functions being performed by the gripper sensor 30/product sensor assembly 32 and controller 106, as was described above.

When the reflected laser beam 84b' detects the folded edge (spine) lying within the virtual window, the printed product is thus accurately located along the belts of the lay-down conveyor and the actual count of pulses for that printed product is transferred to the tracking computer, responsive to the laser sensor 54, for updating the running average of counted pulses for a given number of signatures.

Tracking proceeds as a product moves toward the transfer wheel assemblies 60 and 90 respectively located at the downstream end of the lay-down conveyor 50 and at the upstream end of the stacker infeed section 82.

As one example of the tracking pulses, the encoder 52 generates pulses representing every 0.25 inches of travel. These pulses are counted in a first counter 100-1 having a clock pulse input 101 receiving pulses from encoder 52. A clear/enable pulse is received from the sensor 38 which clears the counter 100-1 to start a new count. The time required for a printed product dropped by release cam 28 onto the lay-down conveyor 50 to reach laser sensor 84' is a function of the weight or mass of the printed product and the velocity of the printed product conveyed to the printed product by the gripper conveyor 20, as was set forth above. Although the rate of movement of lay-down conveyor 50 may change, this will not result in a reduced or increased number of pulses from encoder 52 since the pulses are a function of the distance traveled and the pulse rate thus changes with changes in the velocity of the lay-down conveyor. The count developed in counter 100, together with a logic circuit, described below, is used to develop a "virtual window", between 95 and 105 counts (see output of 102-1) during which time interval the laser sensor 54 is enabled to look for a printed product and is not enabled to look for a printed product outside (i.e., on either the upstream or downstream side) of the virtual window. In one example, it is assumed that the spine of the printed product released by the release cam 28 and deposited on the lay-down conveyor should nominally arrive at the laser sensor 84' after accumulation of M pulses from the encoder 52. A logic circuit 102 is coupled to counter 100 to provide an enabling pulse which enables the laser sensor 84' to search for the spine of the printed product released by the release cam 28, which "window" is maintained, for example, between the M−5 and M+5 pulses from encoder 52 counted from release of a printed product on the lay-down conveyor. The logic circuit 102-1 couples the virtual window pulse 105*a*-1 to gate 109.

When the laser sensor 84' detects the presence of the spine of the printed product, whose count is being accumulated in counter 100-1 in controller 106, and the detection of the spine occurs within the "virtual window" generated by logic circuit 102-1, an output 84*c*' of laser sensor 84' is applied to gate 103, together with an enable pulse from gate 109 present during, the "virtual window" enabling the precise count, for example, a count of M−1, to be transferred from counter 100-1 to memory 104 through gate logic 110. In the event that the laser sensor 84' fails to detect the spine of a printed product, the negative going edge, i.e., the trailing edge of the "virtual window" pulse 105*a* is supplied to CPU 106, causing an average value of the number of pulses to be transferred to memory in place of an exact value. This technique assures a count for every printed product delivered to the lay-down conveyor 50. This average count is employed only when the signature (i.e. product) associated therewith is also "flagged".

In order to assure proper intercept operation in the stacker 80, at least a minimum separation distance of the order of 2.50 inches between spines of adjacent printed products is provided, which minimum amount of spacing is necessitated to enable a stream interruption operation to be successfully performed by a stacker blade in order to obtain an accurate batch count, as is well known in the art.

Five (5) counters 100-1 through 100-5, for example, are provided to store each count. As each printed product is dropped from a gripper conveyor to the lay-down conveyor, a logic circuit such as a closed loop shift register 110 advances its output to the next counter, such as, for example, counter 100-2, to accumulate the count. When the last counter, such as, for example, 100-N is reached, the next counter to be triggered is counter 100-1.

The CPU 106 takes the exact counts stored in memory and averages them. For example, assuming operation is started with no count, the first count entered will be divided by one. When the second count is entered, the first and second counts are summed and divided by two (2) and so forth until five counts are averaged, for example. When the sixth count is received, it is averaged with the second ($2^{nd}$) through fifth ($5^{th}$) counts and the first count is discarded. When the seventh ($7^{th}$) count is received, it is averaged with the third ($3^{rd}$) through the sixth ($6^{th}$) counts and the second ($2^{nd}$) count is discarded, thereby retaining an average of the last five (5) counts developed. As is mentioned above, in the event that the laser sensor 84' fails to detect a spine within the virtual window period shown by pulse 105*a*, the last average count developed by CPU 106 is stored in memory. This average count is used to track a product if it is "flagged". This assures that every product released to the lay-down conveyor 50 will be accounted for for tracking purposes and the tracking apparatus does not rely upon a laser sensor for a product count, but only for tracking.

The product is then accurately tracked from the laser sensor 84' through the transfer wheel assembly 60 and to the transfer wheel assembly 90 located at the upstream end of the stacker infeed conveyor 83. Only a printed product which is flagged with either an:

a) Intercept, b) Intercept and turn, or c) Intercept and eject will now be tracked from laser 54 to transfer wheel assembly 90. Through the use of encoder 52 and given the known and fixed distance between laser 54 and transfer wheel assembly 90, the flagged product is accurately tracked. In the example of a compensated bundle of two (2) batches of twenty (20) signatures, the twenty-first signature is flagged with an intercept and turn flag. The number of pulses generated between sensor beam 84*a*' and the nip N of the transfer wheel assembly 90 is known. When the product identified as the twenty-first ($21^{st}$) product by the controller 106 is detected by sensor 84', the controller counts pulses (for example, 100) from sensor 54 to the nip of transfer wheel assembly 90. At the hundredth ($100^{th}$) pulse, a tracking signal is conveyed to the stacker 80 together with an intercept and turn flag, whereupon tracking of only flagged products is undertaken by the stacker 80. A similar operation occurs when a signature which is the forty-first ($41^{st}$) signature to be delivered to the lay-down conveyor when tracking is transferred to the stacker. However, the flag associated with the forty-first ($41^{st}$) signature is an intercept and eject flag causing the stacker to intercept the forty-first signature to start a first batch of a new bundle and to eject the completed bundle from the turntable.

When a twenty-first ($21^{st}$), forty-first ($41^{st}$), etc., signature is flagged and its leading edge is not detected by laser sensor 84' within the virtual window, the latest average value calculated is examined. Since the tracking (closing) edge of the virtual window occurs five counts after a nominal count M, five (5) counts are subtracted from the count accumulated between sensor 84' and the nip N of transfer wheel assembly 90. In addition, the last average count is examined and the difference between the nominal count and the average count is subtracted (or added) depending on the value of the average count and the number of pulses (i.e. distance) between the average count and the "closing" end of the virtual window.

A fixed distance is established between the laser sensor 84' and the transfer wheel assembly 60 and between the transfer wheel assemblies 60 and 90, as was set forth above. The lay-down conveyor transfer wheel assembly 60, which is preferably comprised of at least two wheels 60*a*, 60*b*, is arranged to press against the printed product stream S so that the lay-down conveyor transfer wheels 60*a*, 60*b* hold down the printed product 25' to prevent printed product 25' from being delivered to the nip N, formed by the transfer wheels of the transfer wheel assembly 90 and the roller 83*b* of stacker infeed conveyor 83, together with printed product 25 due to a frictional force between the engaging surfaces of printed products 25 and 25', which nip N is formed by the stacker transfer wheels 90 and a conveyor belt 83*a* moving about roller 83b at the upstream end of the stacker infeed conveyor. This hold-down feature prevents a printed product in the nip N, which will most likely be accelerated by the stacker infeed 82, from prematurely urging the next printed product 25' to enter into the nip N. Typically, the stacker infeed conveyor operates at a linear speed of the order of 36 inches per second while the lay-down conveyor operates at a slower speed, typically of the order of 18 inches per second and, in addition thereto, the lay-down conveyor 50 is subject to intermittent starting and stopping.

The transfer wheel assembly 60 is mounted upon a pair of arms 61a, 61b, which arms are typically spring-loaded or hydraulically loaded to assure that the transfer wheels press down against the printed product stream S with sufficient force. Note, for example, FIG. 5 which shows printed products 25', 25" and 25'" as experiencing some bending due to the forces applied thereto by the transfer wheels 60a, 60b. Printed products 25', 25" and 25'" are held by the transfer wheel assembly 60 against acceleration due to feeding of printed product 25 into nip N. Note that printed product 25 is free from any influence of transfer wheel assembly 60 as it enters nip N.

The transfer wheel assembly 90 is also preferably comprised of at least a pair of wheels 90a, 90b which press against roller 83b to assure positive drive of a printed product into the infeed of the stacker 80.

In addition to a fixed spacing distance between the transfer wheel assemblies 60 and 90 (which is slightly greater than the length of a newspaper (for example) measured in the feed direction) to prevent newspapers from prematurely entering nip N, it is preferred that the transfer wheels have a minimum diameter preferably of the order of eight inches (8.0") in order to assure that the incoming nip N gets a good grip of the incoming printed product 25 and further to prevent the incoming printed product from "hitting a wall" in the event that the diameter of the transfer wheels is too small. Nevertheless, the diameter of the transfer wheels may be greater or lesser than eight inches (8.00") to accommodate signatures having spines of greater or lesser thickness, so long as the diameter is selected to assure that a good grip is obtained on thick printed products and further to prevent printed products, and especially thick printed products, from "hitting a wall" (i.e., hitting the transfer wheels at about the nine (9) o'clock position) if the diameter of the transfer wheels 90 is too small.

Each count of a printed product is accumulated by microprocessor 106 as a printed product is deposited on to conveyor 50. Assuming that the stacker 80 is programmed to produce compensated bundles containing twenty (20) printed products where the first stack of ten (10) printed products is formed and deposited on the turntable, the turntable is rotated and the eleventh printed product is tagged with a first ($1^{st}$) flag to identify the start of the second stack of ten (10) printed products, the twenty-first ($21^{st}$) printed product then carries a second ($2^{nd}$) flag to identify the twenty-first ($21^{st}$) printed product as the first printed product of a new batch and the first printed product of a new bundle. The tag for the eleventh printed product identifies the need for an intercept operation and a turntable operation and the tag for the twenty-first ($21^{st}$) printed product identifies the need for an intercept operation and a bundle eject operation. Microprocessor 106 delivers only the "tagged" signals to the stacker 80.

The laser sensor 84', as was described above, is fixedly located at a known distance from the intercept position. However, it should be understood that laser sensor 84' only tracks the position of printed product spines and is not used to count printed products. The controller (microprocessor) 106 counts the encoder pulses from the laser sensor to the nip N and hands over only the "tagged" products being tracked to the stacker controller 86. The stacker then counts pulses (i.e., "tracks" a tagged product) from the stacker encoder 87 to the intercept point.

A given pulse count of the lay-down conveyor encoder pulses starting with sensing of a spine (i.e. folded edge) of a product by sensor 54 identifies the moment when the spine of a printed product reaches the nip N of the stacker transfer wheels 90, at which point a handover is made to the infeed transfer wheels 90. At that precise moment, the tracking function is now handed over to the stacker infeed 83. Encoder 87 provided in stacker 80 generates a pulse for every 0.25" of linear travel of the infeed belts 83a. By knowing the distance from the transfer wheel 90 to the intercept point, which is a fixed, predetermined distance, the spine of the product is accurately tracked.

FIGS. 6A through 6C, taken together, show a flow diagram of the technique of the present invention. In this example, it is assumed that bundles of twenty (20) printed products are formed.

At step S1, the system is initialized in preparation for operation. At step S2, each gripper 24 of the gripper conveyor 20 is examined by the gripper sensor 30. If a gripper 24 is not present, the routine loops back to step S2. If a gripper is present, the routine branches to step S3 whereupon the product sensor 32 is enabled. The routine advances to step S4 to examine the product sensor 32.

If a printed product is present, the routine branches to step S5 wherein the product is tracked to the release cam 28 such as, for example, by way of the three (3)-stage shift register 40 shown in FIG. 3b.

At step S6, the gripper release cam 28 is examined. If the release cam contains a product, the routine branches to S7 to determine if: 1) the release cam has been activated; and 2) contains a printed product. The count is transferred to the stacker bundle counter, at step S8. At step S9 the identity of the printed product is determined from the count developed at step S8 in order to establish whether the printed product is the first of a batch or the first of a new bundle. An intercept/turn flag is associated with an eleventh ($11^{th}$) signature, and an intercept/eject flag is associated with a twenty-first ($21^{st}$) signature. At step S10 the tracking of a printed product transferred to the lay-down conveyor 50 is initiated. Encoder 52, develops the encoder pulses used to accumulate a count as described above. The gripper sensor 34 and printed product sensor 36 confirm if a printed product has been dropped. If not, the count is disabled before the next gripper is opened by the release cam. The stacker bundle counter provides flag signals which flag the eleventh and twenty-first, etc. printed product to respectively identify the need for an intercept/turn or intercept/eject bundle signal, where applicable.

At step S11, the encoder pulses from encoder 52 associated with a signature being tracked are counted as the signature, dropped on to the lay-down conveyor, moves from the release cam point to the laser sensor 84'. The "virtual window" provided at step S12 enables the laser sensor 84' to look for a spine of a given printed product only within the virtual window which is a given range between the upstream and downstream sides of a "nominal" pulse count.

At step S11, the laser sensor 84' looks for the spine of a product within the virtual window which, in a preferred embodiment, is of the order of plus or minus two inches (±2.0"), i.e. ±4 pulses, from a set distance between the release cam 28 and the laser sensor 54.

If the laser sensor 84' fails to detect the spine within the virtual window, the routine branches to step S13 wherein the microprocessor inserts the updated average count (distance) measured between the release cam 28 and the laser sensor 84' and thereafter if the printed product is flagged, as detected at step S15, the printed product is tracked to the nip point N of the stacker transfer wheels 90, employing encoder 52, at step S16. Only a flagged product is tracked from the laser 84', or the point where the updated average count is inserted, to the transfer wheels 90. In the event that the laser sensor 84' fails to detect the spine of a printed product within the virtual window, the program alternatively branches to routine step S13 wherein tracking of the product is based upon addition of the pulses between the nominal count and the closing edge of the virtual window from the pulse count to nip N, plus or minus the difference between the average count and the nominal count.

In the event that the average count is substituted due to failure of the laser sensor to detect a spine within the virtual window, the average count for that printed product is transferred into memory. The average of the counts for the last five (5) printed products, including the average count determined at S14, is averaged using the FIFO method. In the event that a count is determined to lie within the virtual window, at step S12, the exact count is transferred to memory and the average of the counts of the last five (5) signatures is generated at S14, using the FIFO method.

At step S17, when the count indicates that the product has reached the nip N of the transfer wheel assembly 90 mounted within the stacker 80, the encoder 87 controlled by the stacker infeed 82 takes over the tracking of only flagged products with the help of encoder 87. The printed product which is flagged is then tracked employing the stacker infeed encoder 87 geared to the stacker infeed 82, shown in FIG. 2, which is conventional. The stacker encoder count is examined to determine if the printed product has reached the intercept point, at step S18. If the printed product has been flagged, i.e. is the eleventh (11$^{th}$) printed product to be delivered to the stacker (when building stacks of ten (10)), as is detected at step S19, the program branches to step S20 to initiate an intercept/turn operation. The routine, at step S21, determines if the printed product has been flagged to initiate a turn cycle for turning the turntable 85. If so, the program performs a turn cycle, at step S22.

If the product is not flagged to initiate a turn cycle, the routine branches to step S23 to determine if the product has been flagged to initiate an eject cycle and, if so, the routine advances to step S24 to initiate an eject cycle for ejecting a completed, compensated bundle from the turntable 85 to a receiving device which is typically a wrapping or tying device, not shown for purposes of simplicity.

The routine returns either after step S22 or step S24 to repeat the operating cycle described above.

What is claimed is:

1. A method for positively detecting printed products delivered to a lay-down conveyor by grippers of a gripper conveyor and followed by delivery of products by the lay-down conveyor to a stacker infeed, comprising:
   a) determining, at a product release location, if a printed product is deposited from a gripper to the lay-down conveyor;
   b) accumulating a count of each deposited printed product responsive to step (a); and
   c) tracking travel of a printed product along the lay-down conveyor from said product release location.

2. The method of claim 1 wherein step (c) further includes:
   d) generating pulses each representing a given travel distance between said product release location to a given location along the lay-down conveyor downstream of the product release location.

3. The method of claim 2 further comprising:
   e) accumulating pulses generated at step (d) when a printed product is released at said product release location.

4. The method of claim 3 further comprising:
   f) detecting a presence of a leading edge of each printed product deposited on the lay-down conveyor at said given location.

5. The method of claim 4 further comprising:
   g) developing an average value of a count accumulated at step (e) of a given number of counts for a given number of printed products deposited on the lay-down conveyor at the product release location; and
   h) updating the average value employing a first-in/first-out (FIFO) technique.

6. The method of claim 4 further comprising:
   g) determining presence of a product passing said given location; and
   h) initiating tracking from said given location to an infeed nip location in the stacker infeed responsive to step (g).

7. The method of claim 5 further comprising:
   g) looking for passage of a product at said given location;
   h) adopting an average count when a detection operation performed in step (g) fails to detect a printed product within a given count range.

8. The method of claim 6 further comprising:
   i) initiating tracking from an infeed nip of the stacker to an intercept point in the stacker responsive to accumulation of a count of pulses representing movement of the printed product from said given location to said infeed nip.

9. The method of claim 8 wherein step (g) further includes fixing a distance between said given location and said infeed nip.

10. The method of claim 1 further comprising:
    d) examining each gripper as it passes downstream of the release cam location and before a next succeeding gripper reaches said release cam location to determine if a printed product indicated as having been released at the release cam location has in fact been released; and
    e) canceling tracking of a printed product from being tracked along the lay-down conveyor when step (d) indicates that a printed product was not released when the release cam was engaged.

11. In combination, a gripper conveyor having a plurality of spaced apart grippers for conveying printed products along a given path;
    a release cam for releasing printed products from grippers passing a release cam location when the release cam is engaged;
    a lay-down conveyor positioned beneath said release cam for receiving printed products released from grippers as they pass the release cam;
    a stacker for stacking printed products positioned to receive printed products from a downstream location of the lay-down conveyor;
    a gripper sensor located a given distance upstream relative to the release cam location for detecting a presence of a gripper;
    a product sensor for detecting a presence of a product by a gripper which has activated the gripper sensor;

said release cam being activated to open a gripper passing the release cam responsive to a release signal;

a generator for generating a pulses representing movement of said lay-down conveyor; and an accumulator for accumulating said pulses responsive to opening of a gripper carrying a printed product by said release cam.

12. The combination of claim 11 further comprising:

means for accumulating a count representing a number of printed products delivered to said lay-down conveyor responsive to opening of a gripper carrying a printed product by said release cam.

13. The combination of claim 12 further comprising:

means for conveying a flag signal to said stacker responsive to a given count of printed products deposited on said lay-down conveyor when a printed product associated with said given count reached an input nip of said stacker.

14. The combination of claim 11 further comprising:

a second product sensor generating a detection signal as each printed product passes a given location along the lay-down conveyor; and means for tracking each printed product responsive to said detecting signal.

15. The combination of claim 14 further comprising:

means for tracking printed product associated with a given count from said given location to said infeed nip signal responsive to a detection signal.

16. The combination of claim 11 further comprising:

said stacker:

being positioned to receive printed products from a downstream location of the lay-down conveyor; and having means for generating an interrupt signal.

17. The combination of claim 10 further comprising counting means for accumulating said count pulses; and means for generating control pulses for controlling operation of the stacker when predetermined counts have been reached.

18. The combination of claim 17 wherein one of said control pulses is employed to operate a stacking blade to intercept a stream of signatures delivered to said stacker.

19. The combination of claim 16 wherein one of said control pulses is employed for operating a turntable in said stacker.

20. The combination of claim 16 wherein one of said control pulses is employed for ejecting a completed bundle from said stacker.

21. A method for tracking printed products conveyed along a path to a stacker in imbricated fashion comprising:

detecting a presence of a printed product delivered to a receiving end of said path and sending a printed product count to the stacker;

generating pulses representing a linear speed of the printed products being conveyed along said path;

detecting folded edges at a given location along the path; and alerting the stacker as to a position of each printing product.

22. A method for tracking printed products being delivered to a stacker, comprising:

depositing printing products upon a conveyor for delivery to the stacker so that printed products are arranged in imbricated fashion with folded edges downstream;

generating pulses representing a speed of the conveyor;

initiating accumulation of said pulses for each printed product as it is deposited on the conveyor;

sensing folded edges as they pass a location along the conveyor intermediate the deposit point and the stacker;

halting counting of pulses for each printed product when the folded edge of the printed product passes the sensing point; and forming an average count from a given number of said counts.

23. The method of claim 22 wherein accumulated counts for printed products falling outside of a given range are replaced by the average count.

24. The method of claim 22 wherein said average count is continuously updated.

25. Apparatus for tracking printed products being delivered to a stacker, comprising:

means for depositing printed products upon a conveyor for delivery to the stacker so that printed products are arranged in imbricated fashion with folded edges facing downstream;

means for generating pulses representing a speed of the conveyor;

means for accumulating said pulses for each printed product as it is deposited on the conveyor;

means for sensing printed products as they pass a given location along the conveyor intermediate the deposit point and the stacker;

means for determining a count, based accumulation of said pulses, for each printed product when the printed product passes said given location; and means for generating an average count from counts representing a given number of the printed products that have passed said given location.

26. The apparatus of claim 25 comprising:

means for replacing accumulated counts for printed products falling outside of a given range of accumulated counts by the average count.

27. The apparatus of claim 25 wherein said average count is continuously updated.

28. The apparatus of claim 25 wherein said stacker comprises:

an infeed section;

downstream edges of printed products being spaced apart by a first given distance on said conveyor;

said conveyor having a downstream end adjacent to said infeed section;

a first transfer wheel assembly adjacent said downstream end pressing said imbricated stream of a printed products between the first transfer wheel assembly and said conveyor;

a second transfer wheel assembly at an input end of said infeed section forming an infeed nip with a stacker conveyor in said infeed section for pressing the imbricated stream of printed products between said second transfer wheel assembly and said stacker conveyor; and said first and second transfer wheel assemblies being spaced by a second given distance which is greater than a length of printed products measured in the feed direction to assure that an upstream printed product resting on a downstream printed product whose downstream edge is entering said nip is under the influence of only the first transfer wheel assembly and the downstream printed product is under the influence of only said second transfer wheel assembly to prevent the upstream printed product from being drawn toward said nip due to a frictional force exerted upon the upstream printed product by the printed product whose folded edge is entering said nip.

29. The apparatus of claim 28 wherein said second transfer wheel assembly has transfer wheels of a diameter sufficient to assure that folded edges entering said nip are positively drawn into said nip.

30. The apparatus of claim 29 wherein said diameter is in the range of 6 to 10 inches.

31. The apparatus of claim 29 wherein the first transfer wheel assembly has wheels with diameters equal to the diameters of said second transfer wheel assembly.

32. The apparatus of claim 28 wherein the operating speeds of the conveyor moving printed products to the stacker and said stacker infeed conveyor are different.

33. The apparatus of 32 wherein the stacker infeed conveyor speed is greater than the speed of the conveyor delivering printed products to the stacker.

34. A method for controlling a stacker, comprising:
depositing printed products on a lay-down conveyor which delivers printed products to the stacker;
counting each printed product deposited on the conveyor;
associating a flag with selected printed products based on said count;
detecting when a flagged printed product reaches a given location along said conveyor, which location is a fixed distance upstream from an input nip of a stacker infeed;
tracking the flagged printed products to the nip point; and
providing a signal to the stacker to perform tracking flagged printed products between said nip and an intercept location.

35. The method of claim 34 wherein the step of tracking printed products moved by the conveyor comprise generating pulses responsive to movement of said conveyor by a given distance.

36. The method of claim 34 wherein the flagging step further comprises providing a first flag signal responsive to one given count which requires performance of an intercept and turn operation when the printed product associated with the first flag signal reaches an intercept point in the stacker and a second flag signal responsive to another given count which requires performance of an intercept and eject operator when the printed product associated with the second flag signal reaches the intercept point.

37. The method of claim 36 further comprising said stacker intercepting an incoming stream of printed products and turning a turntable responsive to receipt of said first flag signal when the printed product associated with the first flag signal reaches the intercept point.

38. The method of claim 36 further comprising said stacker intercepting an incoming stream of printed products and ejecting a completed bundle from a turntable responsive to receipt of said second flag signal when the printed product associated with the second flag signal reaches the intercept point.

39. The method of claim 1 wherein step (a) further comprises:
employing a light source/light detector assembly to detect a presence of a printed product in a gripper reaching the product release location.

40. The method of claim 4 wherein step (f) further comprises:
employing a laser sensor at said given location to detect a leading edge of passing printed products.

41. The combination of claim 11 wherein said product sensor is a light source/light detector assembly.

42. The combination of claim 14 wherein said second product sensor is a laser sensor.

* * * * *